(12) United States Patent
Marduel et al.

(10) Patent No.: US 12,521,911 B2
(45) Date of Patent: Jan. 13, 2026

(54) FACILITY FOR POWDER IMPREGNATION OF AT LEAST ONE YARN AND/OR RIBBON TYPE SUBSTRATE TO BE TREATED

(71) Applicant: FIBROLINE, Limonest (FR)

(72) Inventors: Joric Marduel, Chazay D'azergues (FR); Sofien Bouzouita, Tassin la Demi Lune (FR); Marc Dedieu, Les Cheres (FR)

(73) Assignee: FIBROLINE, Limonest (FR)

( * ) Notice: Subject to any disclaimer, the term of this patent is extended or adjusted under 35 U.S.C. 154(b) by 433 days.

(21) Appl. No.: 18/026,916

(22) PCT Filed: Sep. 20, 2021

(86) PCT No.: PCT/FR2021/051602
§ 371 (c)(1),
(2) Date: Mar. 17, 2023

(87) PCT Pub. No.: WO2022/058696
PCT Pub. Date: Mar. 24, 2022

(65) Prior Publication Data
US 2023/0323559 A1 Oct. 12, 2023

(30) Foreign Application Priority Data
Sep. 21, 2020 (FR) .................................... 2009532

(51) Int. Cl.
*B29B 15/12* (2006.01)
(52) U.S. Cl.
CPC .................. *B29B 15/12* (2013.01)
(58) Field of Classification Search
None
See application file for complete search history.

(56) References Cited

U.S. PATENT DOCUMENTS 4,582,718 A * 4/1986 Escallon ............... B05B 7/1445
118/627
4,622,235 A * 11/1986 Goerens ................. D02G 3/408
118/640

(Continued)

FOREIGN PATENT DOCUMENTS

| EP | 1526214 A1 | 4/2005 |
| EP | 2331309 A1 | 6/2011 |
| WO | WO-2010001043 A1 | 1/2010 |

OTHER PUBLICATIONS

International Search Report and Written Opinion issued in International Patent Application No. PCT/FR2021/051602, mailed Jan. 18, 2022.

*Primary Examiner* — Binu Thomas
(74) *Attorney, Agent, or Firm* — MARSHALL, GERSTEIN & BORUN LLP (57) ABSTRACT

The invention relates to an installation for impregnating powder on at least one substrate to be treated of the yarn and/or tape type. The installation includes a powder delivery unit, a unit supplying the substrate to be treated, at least two electrodes and a circulation zone for the powder and the substrate to be treated. The installation also includes a containment unit having an inlet orifice for the substrate to be treated and the powder, an outlet orifice for the impregnated substrate and a contour area closed from the inlet orifice to the outlet orifice. The circulation zone is formed by the internal volume of the containment unit, and the confinement unit is fixed with respect to at least one of the electrodes. The substrate to be treated and the powder are mobile, in the circulation zone, between the inlet orifice and the outlet orifice of said confinement unit.

12 Claims, 7 Drawing Sheets

(56) References Cited

U.S. PATENT DOCUMENTS

| | | | | |
|---|---|---|---|---|
| 2006/0233966 A1* | 10/2006 | Marduel | ................ | B29B 15/12 427/475 |
| 2009/0151874 A1* | 6/2009 | Caramaro | ............... | B29B 15/12 156/437 |
| 2011/0097505 A1* | 4/2011 | Marduel | ................ | B29B 15/12 118/620 |

* cited by examiner

FACILITY FOR POWDER IMPREGNATION OF AT LEAST ONE YARN AND/OR RIBBON TYPE SUBSTRATE TO BE TREATED

TECHNICAL FIELD

The invention relates to the field of impregnation of porous substrates with powdery materials.

The invention relates in particular to an installation to impregnate powder onto at least one substrate of the yarn and/or tape type to be treated.

The invention finds multiple applications in many fields, depending on the type of substrate and the powder used.

By way of example, mention may be made of the production of bandages impregnated with an antibacterial powder, in the medical field, or the impregnation of a thermoplastic powder in fiberglass yarns for mechanical reinforcement.

BACKGROUND

The impregnation of a porous substrate with a powder makes it possible to advantageously modify its properties. To do this, different techniques may be used. In general, these techniques consist of penetrating the powder into the pores of the substrate by means of a mechanical, pneumatic, electrostatic device, or by means of solvents.

Patent EP 2 331 309 of the Applicant describes an installation for impregnating a porous substrate comprising two electrodes located opposite each other and capable of producing an alternating electric field in the space located between these two electrodes. The substrate and the powder are confined between two conveyors capable of transporting the substrate and the powder to the space located between the two electrodes. Under the effect of the electric field generated by the electrodes, the powder is set in motion almost randomly in all directions. The powder thus penetrates within the pores of the substrate to impregnate throughout its thickness, ideally in a homogenous manner. Such an installation advantageously makes it possible to confine the moving powder and to limit its losses.

However, such an installation is provided for very wide substrates, typically between 0.5 m and 6 m. It is therefore not suitable for substrates with smaller dimensions, that is to say yarns or tapes. In addition, the dimensions of the installation being significantly greater than those of a substrate of the yarn or tape type, the powder would have a low probability of penetrating into the substrate which represents a small volume compared to the electrostatic applicator and the distribution powder within the substrate would not be homogeneous. In addition, the small size of "yarn" or "tape" type substrates does not make it possible to deposit the powder on their surface beforehand by the dusting techniques of the prior art.

Furthermore, the miniaturization of such an installation would prove to be complex and not very advantageous. Indeed, for narrower conveyors, the probability that the powder might escape from the confinement space formed by the conveyors increases markedly. Thus, a large quantity of powder would be wasted compared to the quantity of powder which would impregnate the yarns and/or tapes.

In the installations of the prior art, a fraction of the powder which has been set in motion is not impregnated in the porous material and is deposited on the conveyors which are arranged above and below the material and which make it possible at the outlet of the installation to recover this non-impregnated powder. The processing of a yarn would not be compatible with this configuration because the conveyors are not the width of a yarn. The treatment of a yarn in a conventional installation therefore leads to a significant loss of powder on the conveyors, the surface of which is much greater than the yarns or the tapes.

The technical problem which the invention proposes to solve is to develop an installation making it possible to impregnate in a homogeneous manner substrates with smaller dimensions than the substrates of the Prior Art, such as tapes or yarns, while limiting powder waste and without going through a preliminary step of depositing powder on the surface of the porous substrates.

SUMMARY OF THE DISCLOSURE

To address this problem, the Applicant has developed an installation for impregnating powder on at least one substrate of the yarn and/or tape type to be treated, comprising:
a powder delivery unit;
a unit for supplying the substrate to be treated;
at least two electrodes connected to an alternating current generator and capable of creating an alternating electric field in the space formed between said electrodes; and
a circulation zone of the powder and of the substrate to be treated extending at least in the zone where the alternating electric field prevails.

Such an installation is characterized in that:
the impregnation installation further comprises a containment unit having an inlet orifice for the substrate to be treated and the powder, an outlet orifice for the impregnated substrate and a closed contour section from the from the inlet orifice to the outlet orifice; the circulation zone being formed by the internal volume of said containment unit; and
the confinement unit is fixed with respect to at least one of the electrodes; the substrate to be treated and the powder are mobile in the circulation zone, between the inlet orifice and the outlet orifice of said confinement unit.

In other words, the Applicant has developed an installation for impregnating yarns and/or tapes in which the substrate and the powder circulate within a fixed confinement unit, typically a tube. Advantageously, the impregnation installation according to the invention does not require the use of conveyors to move the substrate within the confinement unit. In addition, compared to the installations of the prior art, the feed units must set the substrate in motion, and therefore subject it to a certain tension, which may have the effect of reducing the size of the pores of the substrate to be processed. Unexpectedly, however, the impregnated substrate has a homogeneous impregnation comparable to that of the installations of the prior art.

In practice, a portion of the confinement unit protrudes from the space formed between the electrodes so as to allow the powder and the substrate to be treated to enter into contact before the application of the electric field that sets the powder in motion. Thus, the powder is as close as possible to the substrate, advantageously deposited on its surface. The distance to be traveled by the powder, before penetrating into the pores of the substrate, is thus reduced. This allows the powder to penetrate deeper into the substrate. Likewise, the intensity of the electric field necessary to set the powder in motion may be reduced in order to save energy.

In practice, the electric field applied to the powder must allow the latter to move inside the confinement unit. Thus, by alternating field, we mean an electric field that is not strictly continuous, but which has a variable component over time. This variable component may potentially be added to a continuous component, for example when the field results from the application of a potential between electrodes resulting from the rectification of a sinusoidal potential.

In general, the installation comprises two electrodes that are placed opposite to each another, so as to generate an electric field outside the confinement unit, and which passes through the latter.

In some cases, and in particular when the substrate is made of a conductive material, the substrate forms one of the two electrodes and is connected to the electric generator. The electric field is then created between the electrode(s) external to the confinement unit, and the substrate, if killed, inside the confinement unit.

The containment unit may adopt different geometries without changing the invention. In particular, the confinement unit is a circular-shaped tube.

As a variant, the confinement unit is an oblong-shaped tube. Alternatively, the confinement unit is a rectangular-shaped tube. For these last two scenarios, the geometry of the confinement unit has the effect of concentrating the electric field produced by the electrodes. The powder particles thus acquire a higher speed allowing them to penetrate more deeply within the substrate. At an equally applied voltage level, the installation of this type therefore allows better impregnation than on the installations of the prior art. Thus, the yield is higher and the depth of impregnation is greater thanks to the confinement unit. This containment unit therefore allows more compact installations and higher processing speeds.

According to another embodiment, the containment unit has at least two portions of different areas.

A first portion has one area, or in the case of a circular tube, a reduced diameter. This first portion typically protrudes upstream of the space formed between the electrodes. It advantageously makes it possible to reduce the free space in which the powder may move so as to concentrate the powder close to the substrate. This configuration is particularly relevant in the case of a vertical installation, because it makes it possible to limit the fall of the powder into the free space along the material to be impregnated.

A second portion has an area that is larger than the first portion. This second portion is placed between the electrodes and is subjected to an electric field. The diameter is larger than the first portion, and thus allows the powder to move almost randomly in all directions and to homogeneously penetrate into the pores of the substrate. In this area, a free space around the material is not a problem because the powder is mainly subjected to electrostatic forces rather than gravity. This larger area is even favorable for properly releasing the powder that might be stuck between the confinement unit and the porous material to be impregnated.

Unexpectedly, it was found, in particular with this configuration, that the larger second area favored the swelling of the fibers under the action of the alternating electric field and, in this way, increased the porosity of the fibrous substrate. The homogeneity of powder impregnation in the fibrous network is thus improved, as is the impregnation efficiency, that is to say the quantity of impregnated powder relative to the quantity of powder deposited.

The configuration of the electrodes placed facing each other is equivalent to a capacitor of determined capacity. At constant material thickness, placing a confinement unit made of a material whose dielectric permittivity is higher than that of air makes it possible to increase the capacitance of the capacitor formed by the electrodes. However, the more the capacitance of the capacitor increases, the higher the electric field present in the circulation zone for the same electric voltage applied to the electrodes and the more the powder acquires a higher speed without additional energy consumption. Maximizing the dielectric permittivity of the material making up the confinement unit thus makes it possible to increase the capacitance of the capacitor formed by the electrodes and to improve the efficiency of the device.

In particular, the confinement unit is made of a material whose relative dielectric permittivity is greater than or equal to 2, which makes it possible to maximize the impact of the confinement unit on the electric field applied to the powder particles.

According to a preferred embodiment, the confinement unit is made of a material whose relative dielectric permittivity is greater than 5, and in particular the materials included in the group comprising glass, quartz or ceramic.

Advantageously, the containment unit is oriented vertically. In this way, the powder which has not penetrated the pores, and which has remained on the surface of the substrate, falls naturally, under the effect of gravity, into a container provided for this purpose under the installation.

In some applications, it may also be possible to apply an essentially continuous electric field in certain parts of the installation, allowing, for example, the previously treated substrate to be covered with an alternating field thus ensuring the impregnation of the powder.

BRIEF DESCRIPTION OF THE FIGURES

Other advantages and characteristics of the invention will appear upon reading the following description, given by way of illustrative and non-limiting example with reference to the following appended figures.

DETAILED DESCRIPTION

Figure 1:
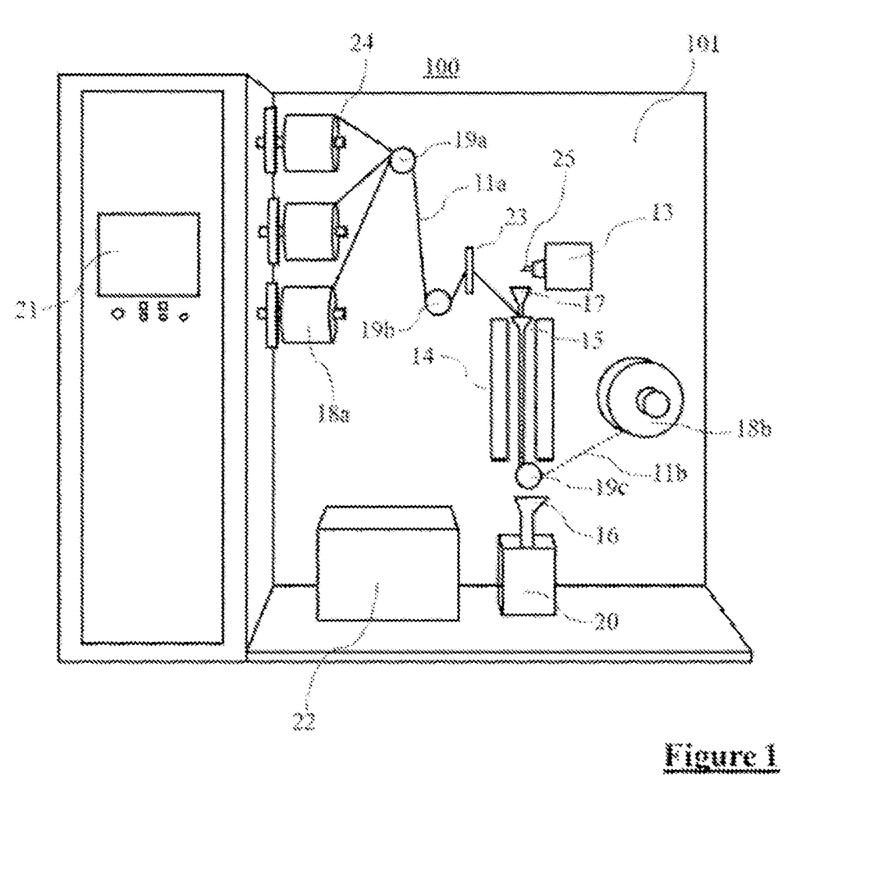
FIG. 1 is a basic perspective view of a powder transfer impregnation installation according to one embodiment of the invention.
Figure 2:
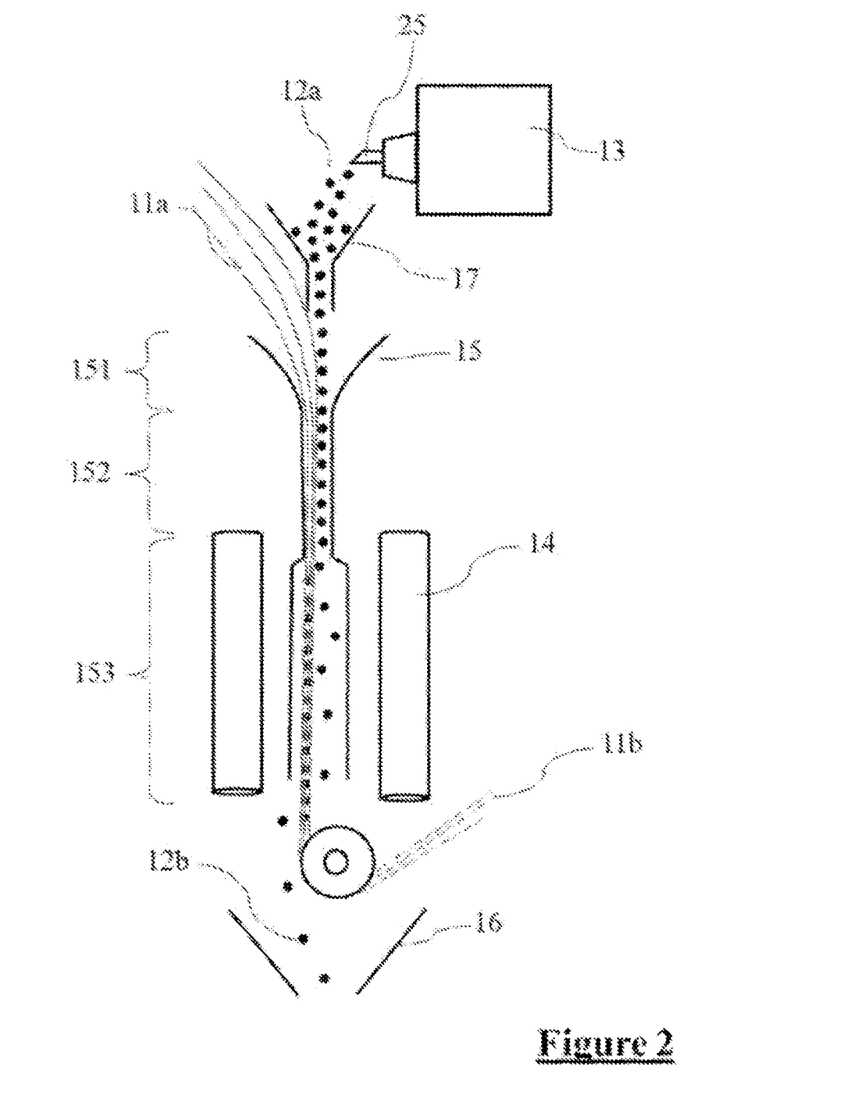
FIG. 2 is a vertical cross-sectional view of the installation of FIG. 1, at the containment unit.

As illustrated in FIGS. 1 and 2, an impregnation installation 100 comprises a frame 101 upon which are fixed the feed units 11a for the substrate to be treated, powder feed units 12a and the system making it possible to carry out the actual impregnation.

The impregnation installation 100 is powered by an alternating voltage generator 22 making it possible to deliver voltages on the order of a few thousand to a few tens of thousands of volts. The alternating voltage generator 22 makes it possible in particular to supply two electrodes 14, arranged opposite each another. The electrodes 14 are arranged vertically, spaced apart by a distance of between 5 and 20 mm. Each electrode 14 is connected to one of the two terminals of generator 22. Other embodiments are possible, in which the electrodes 14 are arranged horizontally. Other electrode geometries are of course possible but must be able to generate an intense alternating electric field on the containment element. In some cases, the substrate may be conductive, and must in this case be electrically grounded. In this case, the geometry and the electrical connection of the electrodes may be adapted in order to again obtain an alternating electric field in the environment of the confinement unit.

The electrodes 14 generate an electric field in the space formed between them. A confinement unit 15 is placed between the electrodes 14. The containment unit 15 is filled with powder 12a and with the substrate 11a to be treated.

The feed units 11a for the substrate to be processed include mandrels 24 upon which the substrate to be treated 11a is packaged in the form of reels 18a. The feed units also include deflection rollers 19a-19b making it possible to convey the substrate 11a to be treated, from the reels 18a, to the impregnation zone and a comb 23 making it possible to separate the various yarns and/or tapes making up the substrate to be treated 11a. In practice, the substrate 11a to be treated may be composed solely of yarns, assembled yarns or solely tapes or a mixture of several types of substrates 11a.

The powder feed units 12a include a powder reservoir 13. The powder 12a is delivered into a funnel 17 from the powder reservoir 13 by means of a feeder screw 25. The feeder screw 25 makes it possible to generate a regulated and regular flow of powder 12a, without lumps. The delivery speed of the powder 12a may be modified by adjusting the speed of rotation of the feeder screw 25.

The impregnated substrate 11b is extracted from the containment unit 15 by the impregnated substrate extraction units 11b. The extraction units 19c, 18b include a return roller 19c and a winding reel 18b allowing the impregnated substrate 11b to be stored.

In practice, the powder flow is optimized to minimize powder losses 12b. The friction of the substrate 11a against the walls of the containment unit 15 makes it possible to convey the rest of the powder 12b which has not penetrated into the substrate 11a as far as the lower end of the containment unit 15. Thus, the remaining powder 12b is extracted from the containment unit 15 towards a second funnel 16 opening out into a recovery tank 20. In the example illustrated, the powder falls by gravity into the recovery tank 20. Alternatively, in a horizontal configuration of the containment unit 15, a conveyor may be used to move the powder from the outlet of the containment unit to the recovery tank 20.

The substrate 11a to be treated may correspond to a yarn with a diameter of between a few microns and a few hundred microns. According to another embodiment, the substrate to be treated 11a may correspond to a tape or a strip with a width of between 0.5 and 10 cm. The substrate 11a to be treated may correspond to any porous material, typically a multi-filament yarn, an assembled yarn, a woven or nonwoven textile, a braid, a roving, and in general all porous filiform materials. The materials include all conventional textile materials whether natural, synthetic or artificial materials.

The powder 12a may correspond to particles with a diameter from the nanometric scale down to a few hundred microns. For example, the powder consists of particles of thermoplastic or thermosetting polymer intended to be melted after cooling, so as to form the matrix of a composite material reinforced by the yarns and/or tapes constituting the substrate. The powder 12a may also correspond to an active ingredient, typically an antibacterial agent, a coloring agent, a fire-retardant agent, etc.

As illustrated in FIG. 2, the substrate 11a to be treated and the powder 12a are brought into contact with each other at an upper portion 152 of the containment unit 15. This upper portion 152 has a reduced diameter, typically between 1 and 10 mm, allowing the powder 12a to be pressed against the substrate 11a to be treated in order to penetrate the containment unit in a synchronized manner with the substrate. The substrate 11a to be treated and the powder 12a are then transported to a second portion 153 of the confinement unit 15, the diameter of which is larger than the portion 152 of reduced diameter. This portion 153 of the confinement unit 15 is positioned between the two electrodes 14 and is subjected to the electric field generated by these electrodes 14. Portion 153 forms a barrier within which moving powder 12a is confined and cannot escape. The powder 12a then forms a cloud of particles in motion which would stagnate at the level of the portion 153 without the traction effect produced by the substrate to be treated 11a, in motion within the confinement unit 15. In this portion 153, the fibers also tend to move, which promotes their swelling according to their texture and the alternating electric field applied. They then have the ability to occupy the entire space of the area and then drag the powder that has penetrated into the porous network.

The powder particles 12a are polarized. Thus, under the effect of the electric field of the electrodes 14, the powder particles 12a are set in random motion within the portion 153 of the confinement unit 15. The speed of the powder particles 12a is an increasing function of the intensity and the frequency of the electric field. The more intense this field, the more the particles acquire a high speed and the deeper they may penetrate within the pores of the substrate to be treated 11a. The frequency may be adjusted according to the powder particle size. Advantageously, the larger particles may be subjected to lower frequency fields to give them time to be set in motion by following the oscillations of the electric field. The frequencies are generally between a few tens to a few hundreds of Hertz.

Figure 3A:
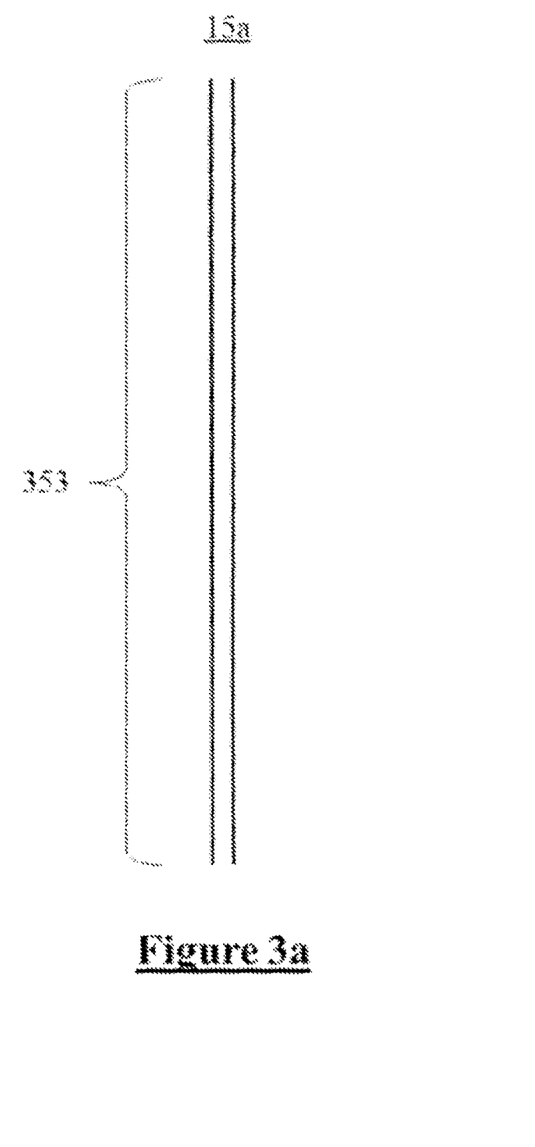
FIG. 3a is a view in median longitudinal cross-section of a first embodiment of the containment unit.
Figure 3B:
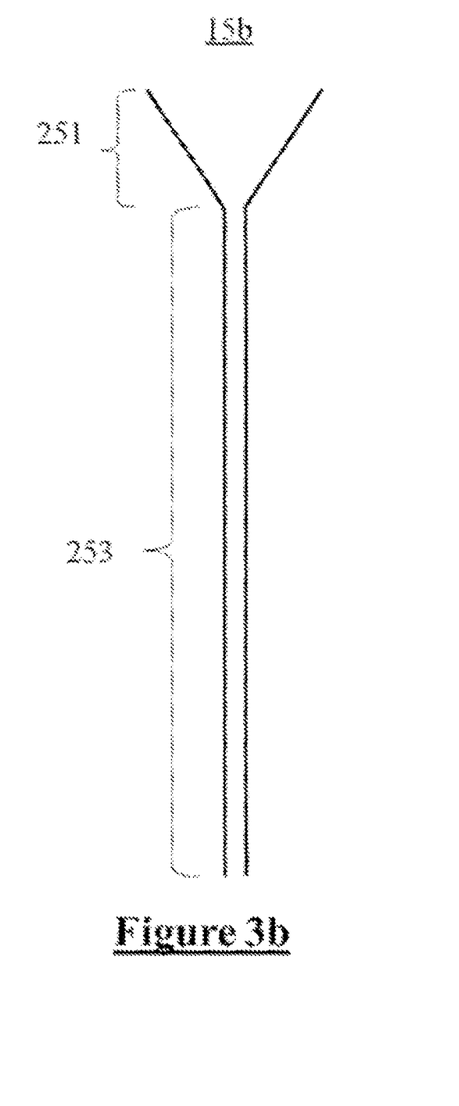
FIG. 3b is a view in median longitudinal cross-section of a first embodiment of the containment unit.
Figure 3C:
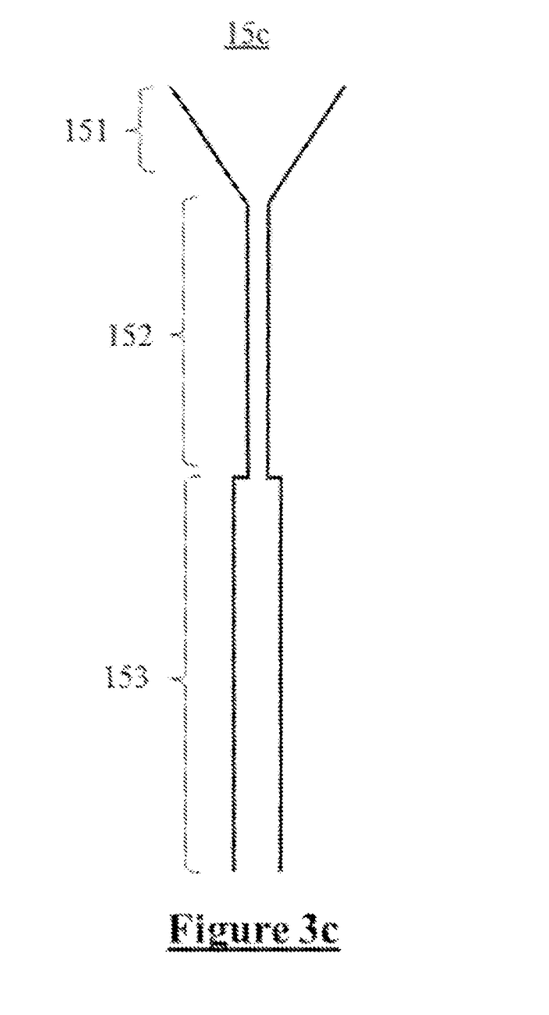
FIG. 3c is a view in median longitudinal cross-section of a first embodiment of the containment unit.

As illustrated in FIGS. 3a to 3c, the containment unit 15a-15c may adopt several geometries.

FIG. 3a illustrates a containment unit 15a comprising a portion 353 of constant diameter from the inlet orifice to the outlet orifice. This geometry is adapted to the porous substrate having a low ability to set the fibers in motion and to swell.

It may also be adapted when the effect of the penetration of the powder into the porous substrate is not very significant and when the desired result corresponds to a location of the powder more on the surface and less at the heart of a porous network.

Advantageously, as illustrated in FIG. 3b, the containment unit 15b may comprise an additional portion 251, located upstream of a portion of constant 253 diameter. This additional portion 251 has the shape of a funnel and is intended to guide the powder 12a in a such a way as to bring it into contact with the moving yarns and/or tapes and in a synchronized manner to obtain the most uniform amount of impregnated powder possible along the yarn or substrate. Indeed, in addition to the desired impregnation effect, it is preferable to obtain a constant powder content over the entire length of the impregnated substrate. For this, the flow rate of the powder dispenser may advantageously be regulated, and the containment unit should preferably not accumulate powder, to avoid drift or variations in the impregnation.

Alternatively, as shown in FIG. 3c, the containment unit 15c may have a funnel-shaped portion 151, a second portion 152 of constant diameter and a third portion 153 of larger diameter than the second portion 152.

The area of the confinement unit 15a-15c may adopt several geometries. By way of example, the area may be round, oblong, square, rectangular or even oval.

These geometries mainly depend on the presentation and characteristics of the substrates to be impregnated. Yarns, assembled yarns, and rovings will require round-shaped sections. Braids, ribbons, fabrics, will require oblong- or rectangular-shaped sections.

These elongated sections are also well suited to processing several yarns or materials in parallel. By placing the filiform or narrow-width materials in parallel advantageously makes it possible to process more substrates simultaneously.

The shape of the containment unit 15a-15c section has an effect on the intensity of the electric field present in the circulation zone of the powder and the substrate to be treated.

Figure 4:
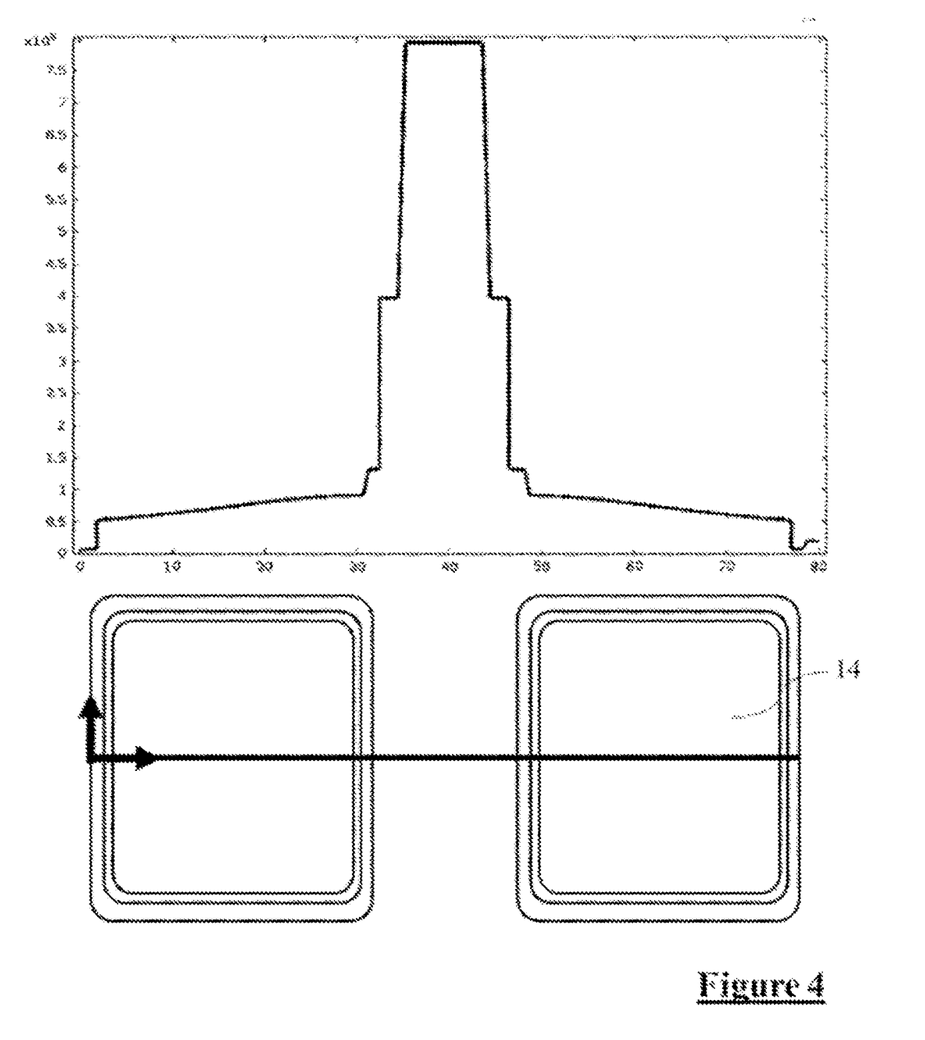
FIG. 4 is a graph of the value of the electric field along an axis passing through the center of the electrodes in the absence of a confinement unit.
Figure 5:
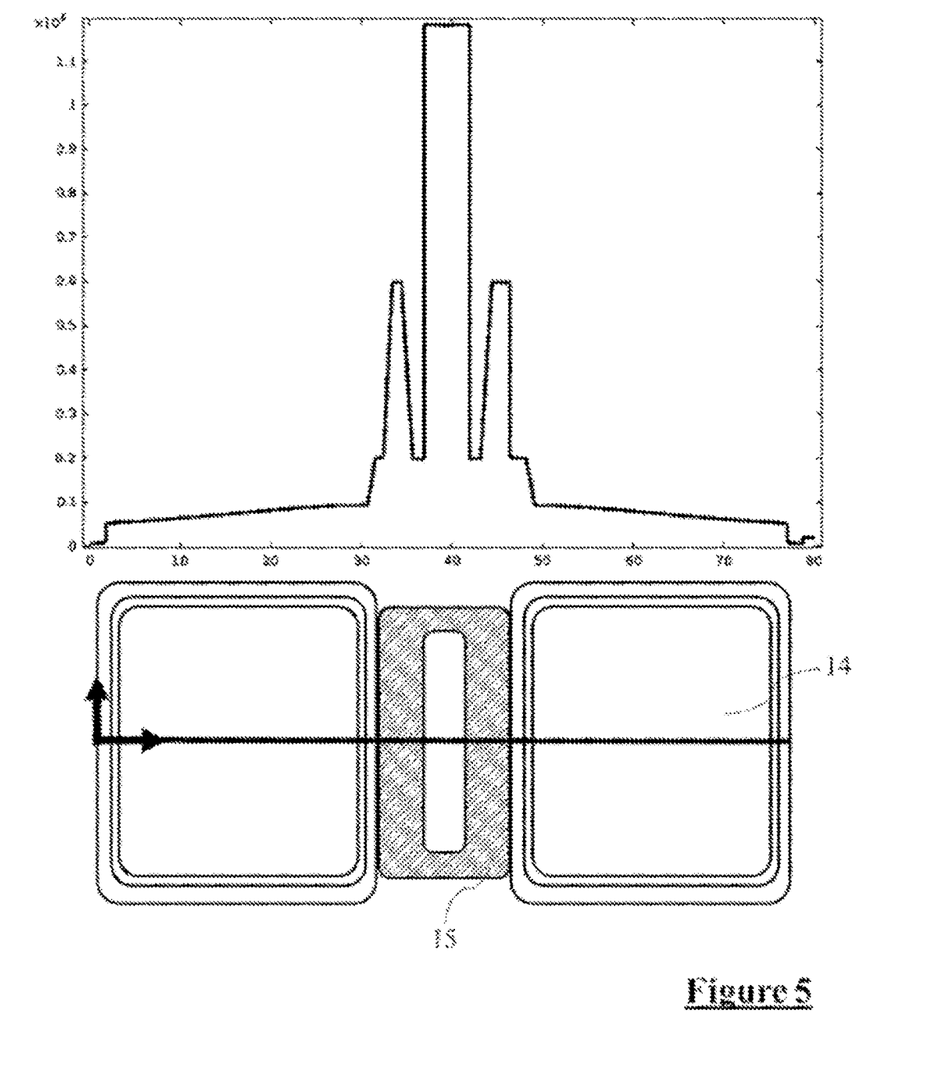
FIG. 5 is a graph similar to that of FIG. 4, in the presence of an oblong-shaped confinement unit.

Indeed, in the example shown in FIG. 4, when no confinement unit 15 is positioned between the electrodes 14, the electric field between the electrodes is $8 \times 10^5$ V/m for a voltage of 10 kV sine wave applied to the electrodes. As illustrated in FIG. 5, when a confinement unit 15 is positioned between the electrodes 14, the field reaches $12 \times 10^5$ V/m. Therefore, the rectangular or oblong shape of the confinement unit 15 makes it possible to increase the electric field by 50% relative to the initial value. It has been found that the confinement unit then acts not only as a closed volume in which the powder and the fiber move to mix, but also as an amplifier for the effectiveness of the treatment. It is thus possible to reach impregnation speeds of up to about 100 m/min to carry out the treatment.

An interface 21 makes it possible to control the impregnation installation 100, for example the speed of movement of the substrate to be treated 11a in the confinement unit 15, the powder delivery speed 12a or even the voltage delivered by the voltage generator alternatives 22.

To conclude, the invention is an installation making it possible to impregnate substrates such as tapes or yarns in a homogeneous and continuous manner, with high efficiency in terms of production speed and quality obtained.

The invention claimed is:

1. An impregnation installation of powder on at least one substrate to be treated of the yarn and/or tape type comprising:
   a powder delivery unit;
   a unit supplying the substrate to be treated;
   at least two electrodes connected to an alternating current generator and capable of creating an alternating electric field in the space formed between the at least two electrodes; and
   a circulation zone of the powder and of the substrate to be treated extending at least in a zone where the alternating electric field prevails,
   a containment unit configured to form a tube placed between the at least two electrodes, and having an inlet orifice for the substrate to be treated and the powder, an outlet orifice for the impregnated substrate and a closed contour cross-section from the inlet orifice to the outlet orifice; the circulation zone being formed by the internal volume of said containment unit;
   wherein the confinement unit is fixed with respect to at least one of the electrodes; the substrate to be treated and the powder being mobile, in the circulation zone, between the inlet orifice and the outlet orifice of said confinement unit.

2. An impregnation installation according to claim 1, wherein the at least two electrodes are placed opposite one another.

3. An impregnation installation according to claim 1, wherein the substrate forms one of the at least two electrodes.

4. An impregnation installation according to claim 1, wherein a portion of the confinement unit protrudes from the space formed between the at least two electrodes so as to allow the powder and the substrate to come into contact in order to be treated.

5. An impregnation installation according to claim 1, wherein the tube of the containment unit is of circular cross section.

6. An impregnation installation according to claim 1, wherein the tube of the containment unit is of oblong cross-section.

7. An impregnation installation according to claim 1, wherein the tube of the containment unit is of rectangular cross-section.

8. An impregnation installation according to claim 1, wherein the containment unit has at least two portions of a different cross-section.

9. An impregnation installation according to claim 1, wherein the confinement unit is made of a material whose relative dielectric permittivity is greater than or equal to 2.

10. An impregnation installation according to claim 1, wherein the confinement unit is made of a material included in the group comprising glass or quartz or ceramic.

11. An impregnation installation according to claim 1, wherein the confinement unit is oriented vertically, the powder delivery unit being arranged above the inlet orifice of the containment unit, the unit supplying the substrate to be treated being configured to supply the substrate from above the containment unit and the electrodes being arranged vertically.

12. An impregnation installation according to claim 1, wherein the at least two electrodes are planar.

* * * * *